United States Patent [19]

Mehl

[11] Patent Number: 4,881,337
[45] Date of Patent: Nov. 21, 1989

[54] METHOD OF LINING BAIT

[76] Inventor: Donald N. Mehl, 5520 Dell La., Minnetonka, Minn. 55345

[21] Appl. No.: 186,368

[22] Filed: Apr. 26, 1988

[51] Int. Cl.$^4$ .............................................. A01K 97/00
[52] U.S. Cl. ......................................................... 43/4
[58] Field of Search .................... 43/1, 4, 42.24, 43.16

[56] References Cited

U.S. PATENT DOCUMENTS

| | | | |
|---|---|---|---|
| 3,385,619 | 5/1968 | Thomas et al. | 43/1 |
| 3,925,919 | 12/1975 | Huth | 43/4 |
| 3,965,605 | 6/1976 | Allen | 43/1 |
| 4,073,083 | 2/1978 | Davis | 43/4 |
| 4,118,881 | 10/1978 | McFarlane | 43/4 |
| 4,674,220 | 6/1987 | Bearce et al. | 43/4 |
| 4,706,403 | 11/1987 | Reynolds | 43/4 |
| 4,709,498 | 12/1987 | Wolski | 43/4 |

Primary Examiner—M. Jordan
Attorney, Agent, or Firm—Hugh D. Jaeger

[57] ABSTRACT

A method of constructing and assembling a fishing lure including a stylet with a hole for pushing through a fishing lure or bait such as a worm from one end to another end, placing monofilament line through the stylet, pulling the line back through the lure, affixing a hook to one end of the line, placing at least a portion of the hook into the lure, and connecting the other end of the line to a fishing tackle connection. The stylet can be utilized with plastic worms, live worms, minnows, or any other type of bait or artificial lures. The method provides for the construction and assembly of a fishing lure with a hook positioned in the rear of the bait, and a monofilament line extending through a mojor portion of the bait.

7 Claims, 10 Drawing Sheets

METHOD OF LINING BAIT

CROSS REFERENCES TO CO-PENDING APPLICATIONS

This patent application is related to the subject matter of a design patent application, Ser. No. 184,175, filed Apr. 21, 1988, entitled "Fishing Lure".

BACKGROUND OF THE INVENTION

1. Field of the Invention - The present invention pertains to a fishing lure, and more particularly, pertains to the method of constructing and assembling a fishing lure and the apparatus for construction and assembling a fishing lure.

2. Description of the Prior Art - There have been two popular prior art fishing lures for bass and walleye fishing, one referred to as the "Texas Rig" and the other referred to as the "Stinger Hook".

The Texas Rig of FIG. 1 has the hook placed at the front end of the bait because there is no way for the fisherman to easily thread the line through the bait. The very active fish will grab the entire rig from behind, and when this occurs there is no problem. Most of the time, however, the fish will grab only part of the bait from behind. When attempting to set the hook, the bait is simply pulled from the fish's mouth and there is a result of not hooking the fish.

A traditional rig with a Stinger Hook of FIG. 2 provides two hooks in the bait joined with a connecting line which tends to get twisted around the bait. The connecting line and stinger hook also restricts natural free movement of the bait and catches weeds and debris. The fish can feel out the stinger line and spit out the bait before the hook can be set. The stinger attachment is bulky and easily tangled. Sometimes the stinger line breaks because light testline is required and fish are able to break away from this light testline.

The present invention overcomes the disadvantages of the prior art by providing a fishing lure which reflects the natural action of the bait and provides for a disguise placement of a fishing hook in the most optimum location for successful hooking of the fish.

Also, the present invention enables the fisherman, while fishing, to quickly construct and assemble the lure utilizing the most effective type and color bait to suit changes in fishing conditions.

SUMMARY OF THE INVENTION

The general purpose of the present invention is a method of constructing and assembling a fishing lure including a stylet with a hole for threading of monofilament line through bait. The fishing lure includes a hook positioned in the bait in a disguised natural configuration of the bait. The stylet provides for the method of constructing and assembling a fishing lure with a hook positioned in the rear of the bait with the fishing line run through the bait and secured to the hook. The bait can either be natural bait, such a minnow or worm, or artificial bait, such as any polymer type of fishing bait.

According to one embodiment of the present invention, there is provided a stylet including a looped or knob end, a longitudinal end, a pointed end, and a slotted or round hole behind the pointed end for accepting an end of a monofilament line. The stylet is pushed through the bait, such as a minnow or a worm, from a rear portion to a front end portion and out through the front end portion, thread in a monofilament line through the slotted hole, and pull the line back through the bait and removed from the stylet. A hook is then tied and secured to that end of the line, the eye of the hook is pulled into the bait, a portion of the shank is pulled into the bait, and the barb of the hook is set into the bait.

One significant aspect and feature of the present invention includes a stylet which pulls monofilament fishing line through the bait easily.

Another significant aspect and feature of the present invention is a fishing bait or a fishing lure which retains natural free movement. There are no external lines to snag or catch weeds or for fish to feel.

Still another significant aspect and feature of the present invention is a fishing lure which can be quickly assembled while fishing.

A further significant aspect and feature of the present invention is a fishing lure where when the fish grabs the fishing lure, known as the bait, the hook is easily set into the fish's mouth.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
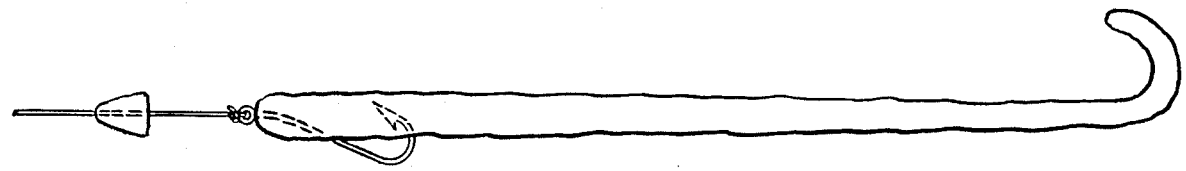
FIG. 1 illustrates a traditional fishing rig as prior art.
Figure 2:
FIG. 2 illustrates a traditional fishing rig with a stinger hook added.
Figure 3:
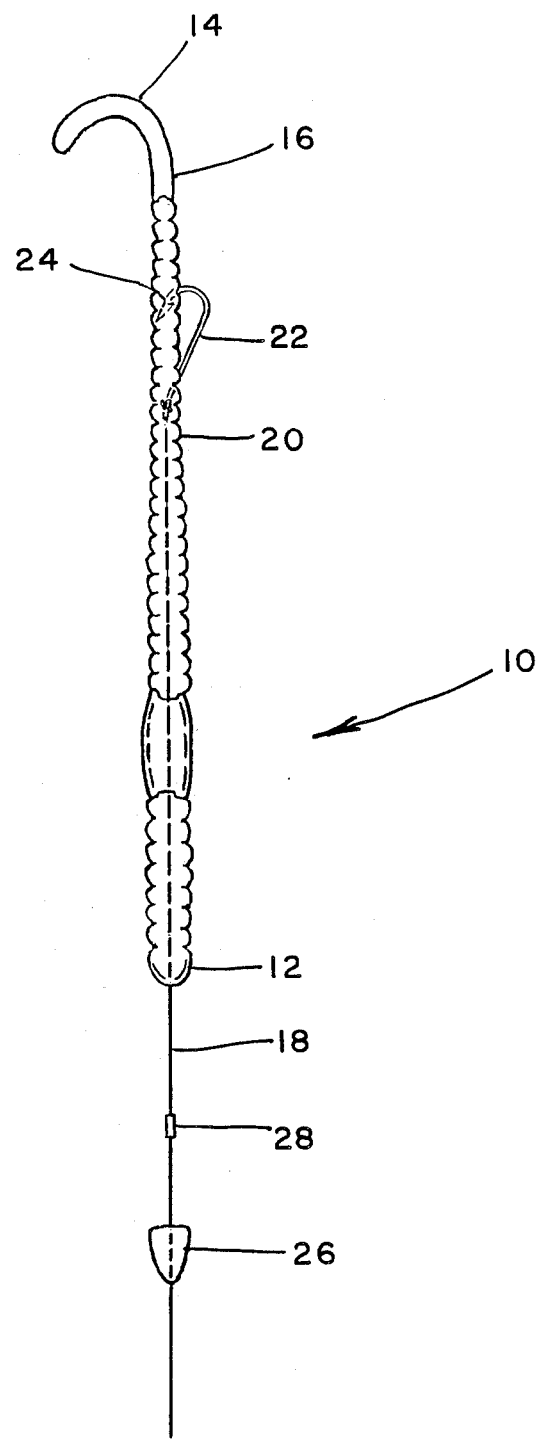
FIG. 3 illustrates a side view of a fishing lure of the present invention.
Figure 4:
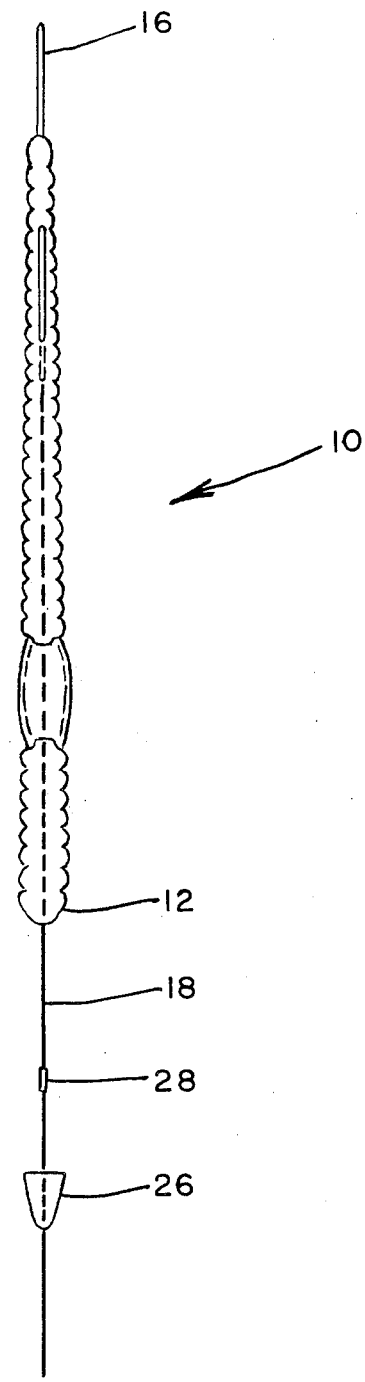
FIG. 4 illustrates a bottom view of the fishing lure.
Figure 5:
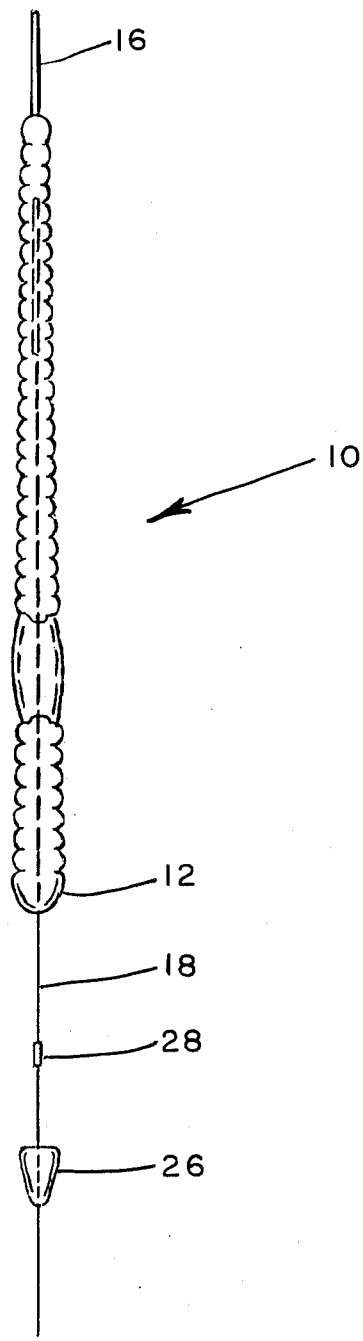
FIG. 5 illustrates a top view of the fishing lure.
Figure 6:
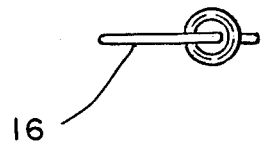
FIG. 6 illustrates a rear view of the fishing lure.
Figure 7:
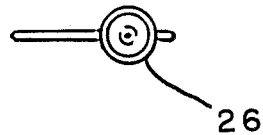
FIG. 7 illustrates a front view of the fishing lure.

FIG. 3 illustrates a side view of a fishing lure 10, a plastic worm, by way of example and for purposes of illustration only and not to be construed as limiting of the invention. The plastic worm includes a proximal end 12, a distal end 14, and a longitudinal body 16. A monofilament fishing line 18 protrudes through the worm, and secures to a eye 20 of a hook shank 22 with a barb 24 positioned in the worm. A slip sinker 26 and an adjustable stop 28 can be positioned on the fishing line.

FIGS. 4-7 illustrate other views of the fishing lure as set forth in the brief description of the drawings where all numerals correspond to those elements previously described.

Figure 8:
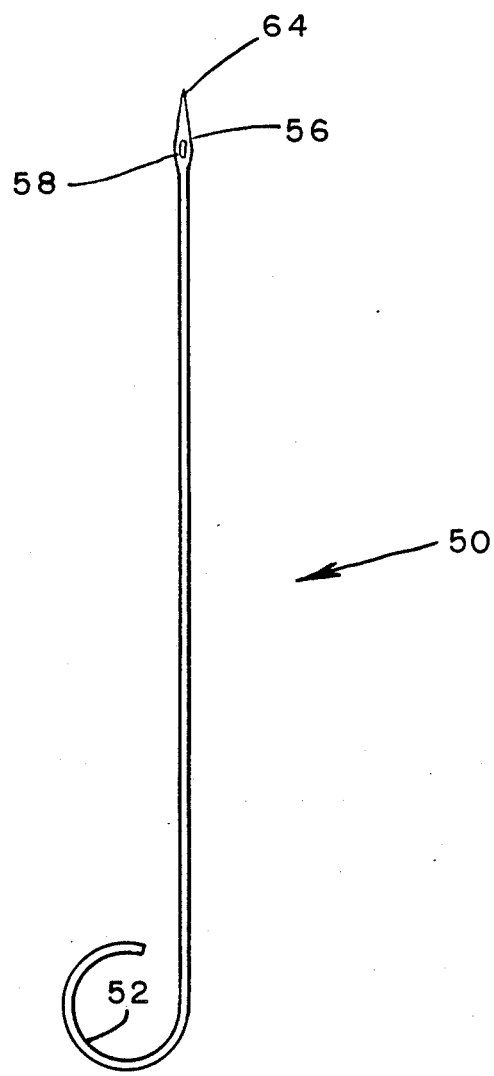
FIG. 8 illustrates a side view of a stylet.

FIG. 8 illustrates a stylet 50 including a finger slot 52, a pointed end 54, a slightly flattened portion 56 and a hole 58 for threading of the fishing line.

Figures 9, 10:
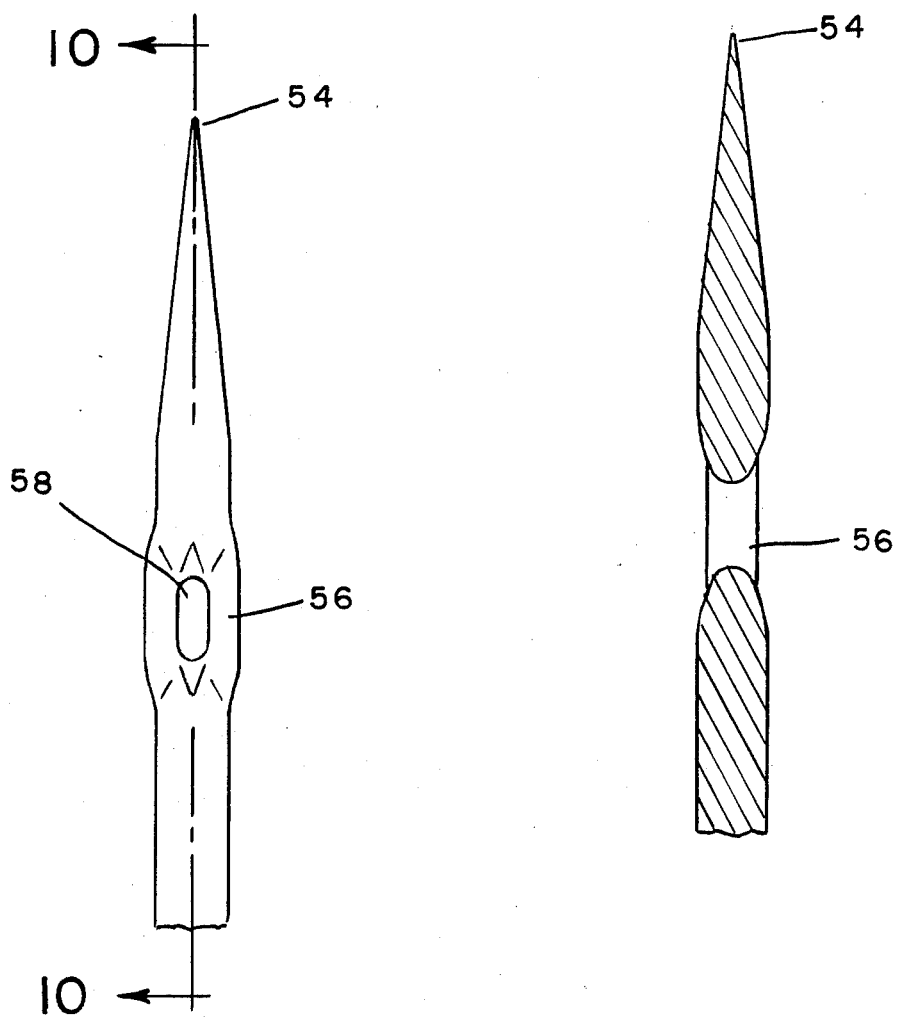
FIG. 9 illustrates an exploded view of the pointed end of the stylet.
FIG. 10 illustrates a sectional view of the pointed end of the stylet.

FIG. 9 illustrates an enlarged view of the sharpened tip with the flattened portion and the hole for threading of the fishing line.

FIG. 10 illustrates a sectional view of the sharpened tip on the stylet 50. The stylet can have an angled point of about 10°. The slot can be of a range of about 0.25×0.050 with rounded edges.

MODE OF OPERATION

FIGS. 11–14 illustrate the method of construction of a fishing lure using a stylet.

Figure 11:
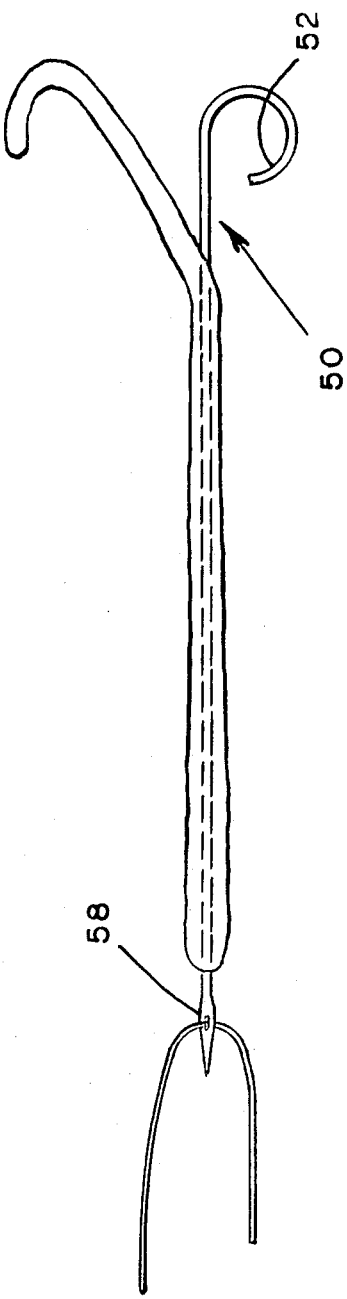
FIGS. 11-14 illustrate the method of constructing and assembling the fishing lure.

FIG. 11 illustrates inserting the stylet through the fishing bait and then threading the line through the slotted hole of the stylet.

Figure 12:
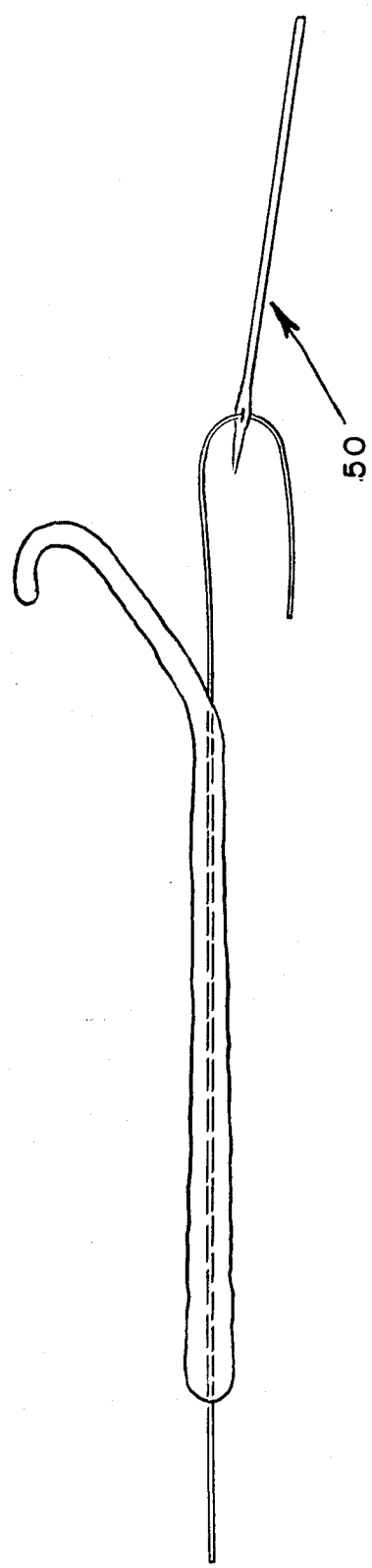

FIG. 12 illustrates removing the stylet from the fishing lure with the line in place through the hole of the stylet.

Figure 13:
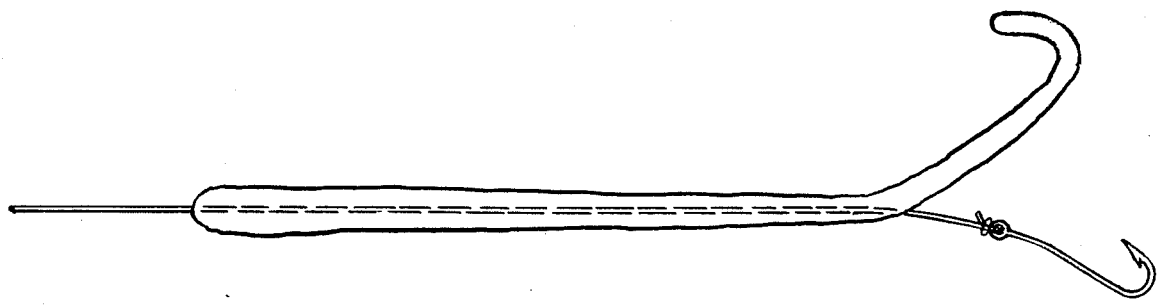

FIG. 13 illustrates tieing the line about the eye of a hook.

Figure 14:
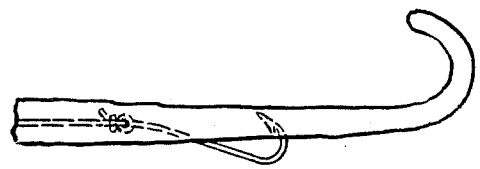

FIG. 14 illustrates sliding the bait down the line and onto the hook and then positioning the hook and the barb for weedless fishing.

Various modifications can be made to the present invention without departing from the apparent scope hereof.

I claim:

1. Process of placing a fishing line in a fishing bait comprising the steps of:
   a. inserting a configured stylet with a point at one end, finger grasping member at another end, and a hole with substantially flattened diametrically opposed surfaces on all sides of the hole and on both sides about the hole of the stylet, the hole is located adjacent to the point, into the fishing bait and out of the fishing bait;
   b. threading an end of the fishing line through the hole and having an overlapping portion of the fishing line whereby said flattened surfaces aids in the ease of threading a fishing line through the stylet and back through the fishing bait;
   c. pulling the stylet back through the bait with the fishing line in the hole; and,
   d. removing the fishing line from the stylet.
2. Process of claim 1 comprising the steps of:
   a. tieing the end of the line onto a hook; and,
   b. pulling out any line slack.
3. Process of claim 2 compring the steps of:
   a. pulling the line with the hook whereby the hook shank slightly engaging into the bait and the barb slightly engaging into the bait.
4. Process of claim 1 wherein said bait is a worm.
5. Process of claim 1 wherein said bait is a plastic worm.
6. Process of claim 1 wherein said baid is artificial.
7. Process of claim 1 wherein said bait is a minnow.

* * * * *